(12) United States Patent
Miyata et al.

(10) Patent No.: US 7,020,399 B1
(45) Date of Patent: Mar. 28, 2006

(54) OPTICAL TRANSMISSION APPARATUS AND METHOD WHICH ADJUST RISE AND FALL TIME OF SIGNAL LIGHT TO BE TRANSMITTED

(75) Inventors: Hideyuki Miyata, Kawasaki (JP); Hiroshi Nakamoto, Kawasaki (JP); Hiroshi Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 428 days.

(21) Appl. No.: 09/272,404

(22) Filed: Mar. 19, 1999

(30) Foreign Application Priority Data
Mar. 20, 1998 (JP) .................................. 10-071525

(51) Int. Cl.
*H04B 10/00* (2006.01)
(52) U.S. Cl. ...................................... 398/162; 398/158
(58) Field of Classification Search ................ 359/180, 359/181, 182, 183, 187, 154, 158, 159, 161; 372/25, 29, 46; 455/69
See application file for complete search history.

(56) References Cited

U.S. PATENT DOCUMENTS

| | | | | |
|---|---|---|---|---|
| 4,723,312 A | * | 2/1988 | Yamashita et al. | 359/180 |
| 4,807,239 A | * | 2/1989 | Takano et al. | 359/175 |
| 5,216,682 A | * | 6/1993 | Hedberg | 372/26 |
| 5,420,868 A | * | 5/1995 | Chraplyvy et al. | 359/173 |
| 5,444,562 A | | 8/1995 | Fuse | 359/161 |
| 5,608,561 A | * | 3/1997 | Marcuse et al. | 359/161 |
| 5,717,510 A | | 2/1998 | Ishikawa et al. | 359/161 |
| 5,754,322 A | | 5/1998 | Ishikawa et al. | 359/135 |
| 5,760,937 A | | 6/1998 | Ishikawa et al. | 359/135 |
| 5,801,860 A | * | 9/1998 | Yoneyama | 359/124 |
| 5,815,294 A | | 9/1998 | Ishikawa et al. | 359/110 |
| 5,870,213 A | | 2/1999 | Ishikawa et al. | 359/135 |
| 5,877,879 A | | 3/1999 | Naito | 359/133 |
| 5,896,217 A | | 4/1999 | Ishikawa et al. | 359/189 |
| 5,909,297 A | | 6/1999 | Ishikawa et al. | 359/161 |
| 5,991,477 A | | 11/1999 | Ishikawa et al. | 385/24 |
| 6,005,890 A | * | 12/1999 | Clow et al. | 359/124 |
| 6,108,119 A | * | 8/2000 | Devenport et al. | 359/181 |

FOREIGN PATENT DOCUMENTS

| | | |
|---|---|---|
| JP | H01-115181 | 5/1989 |
| JP | 2-30233 | 1/1990 |
| JP | H03-235385 | 10/1991 |

(Continued)

OTHER PUBLICATIONS

First Office Action dated Aug. 12, 2003, issued in corresponding Japanese Application H10-071525 including English language translation and list of reference cited.

*Primary Examiner*—Agustin Bello
(74) *Attorney, Agent, or Firm*—Staas & Halsey LLP

(57) ABSTRACT

An optical transmission apparatus and method for changing a rise time ($t_r$) and fall time ($t_f$) of a signal light to be transmitted, to reduce wavelength dispersion characteristics and nonlinear effect of a transmission path. A transmitter includes a $t_r, t_f$ adjusting circuit capable of adjusting $t_r$ and $t_f$ of a modulation signal so that the modulation signal is optimized in accordance with reception characteristics. A modulator then modulates a light with this adjusted modulation signal, and the modulated light is then transmitted to a receiver via a transmission path. Therefore, by transmitting the modulated light having changed $t_r$ and $t_f$, the influence of wavelength dispersion characteristics and nonlinear effect of the transmission path can be offset, so that the waveform deterioration of signal light after transmission can be reduced.

30 Claims, 10 Drawing Sheets

FOREIGN PATENT DOCUMENTS

| | | |
|---|---|---|
| JP | 5-183511 | 7/1993 |
| JP | 5-276121 | 10/1993 |
| JP | H06-261005 | 9/1994 |
| JP | H07-038503 | 2/1995 |
| JP | 08-086991 | 4/1996 |
| JP | 8-237222 | 9/1996 |
| JP | H08-321805 | 12/1996 |
| JP | H09-027647 | 1/1997 |
| JP | H09-046318 | 2/1997 |
| JP | 9-116493 | 5/1997 |
| JP | H10-51389 | 2/1998 |

* cited by examiner

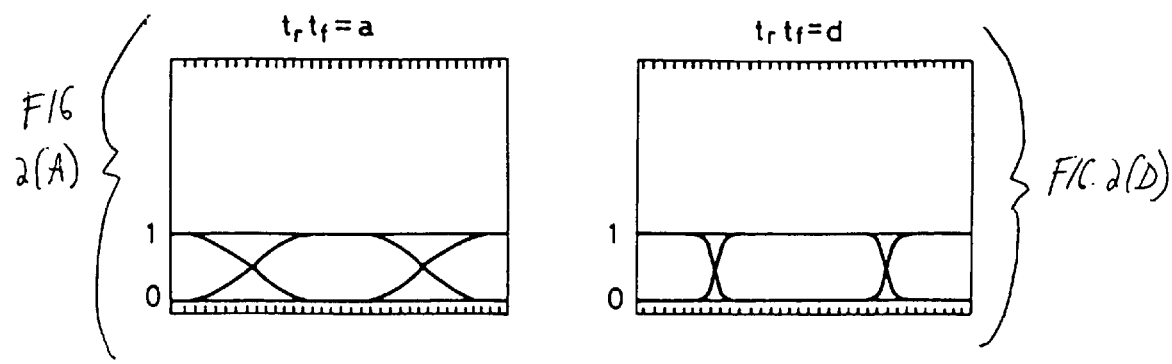
FIG. 2(A)
FIG. 2(D)
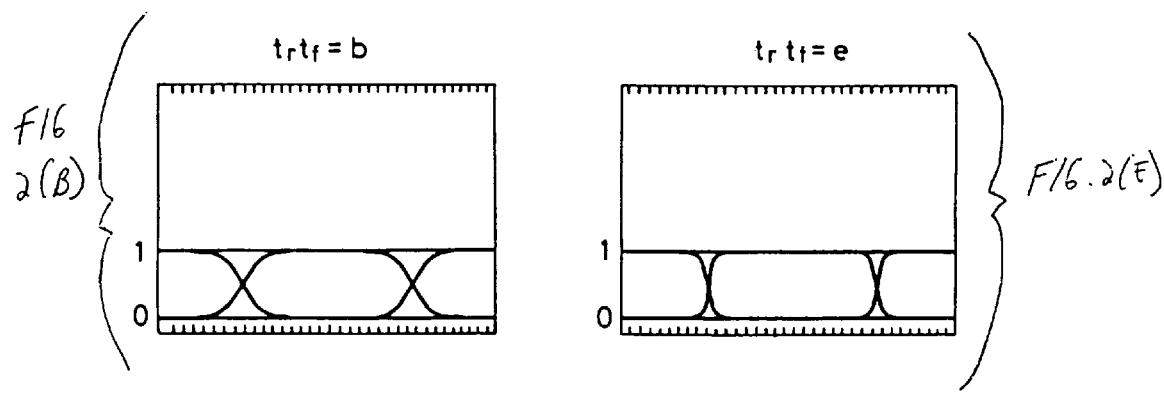
FIG. 2(B)
FIG. 2(E)
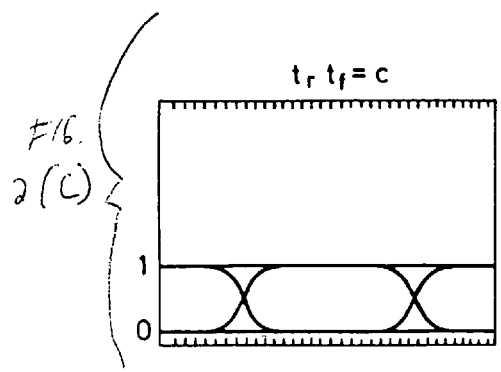
FIG. 2(C)

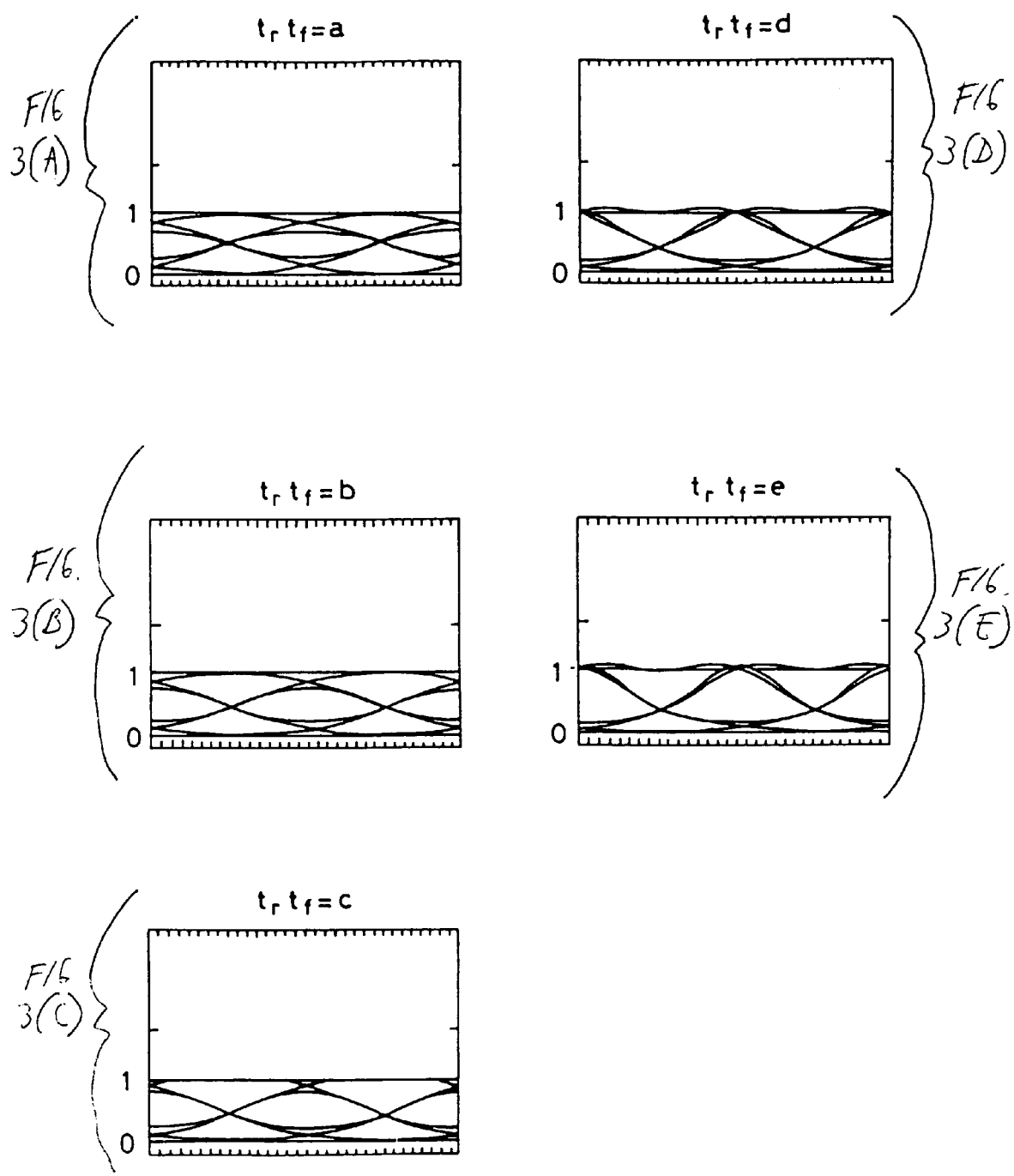

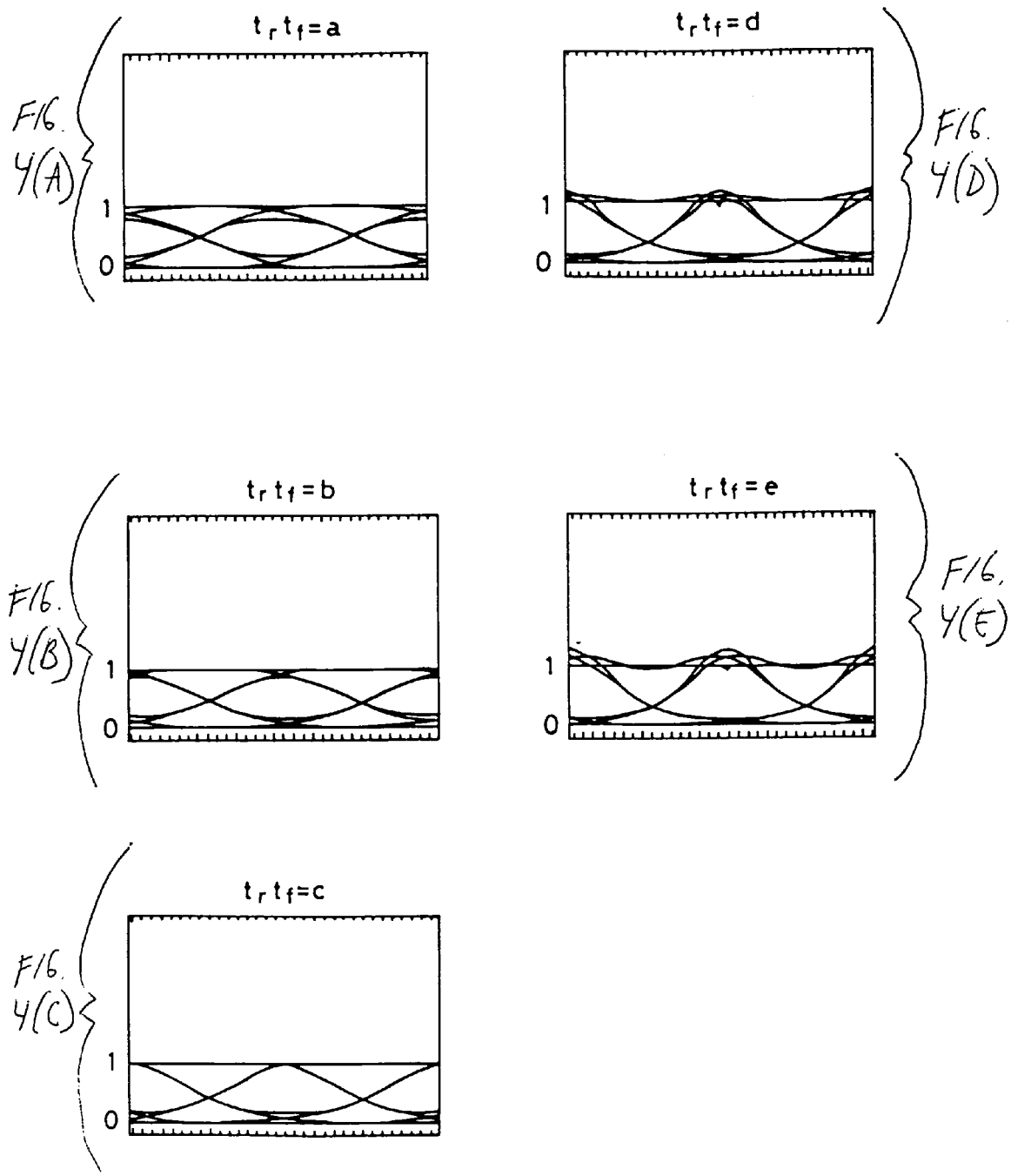

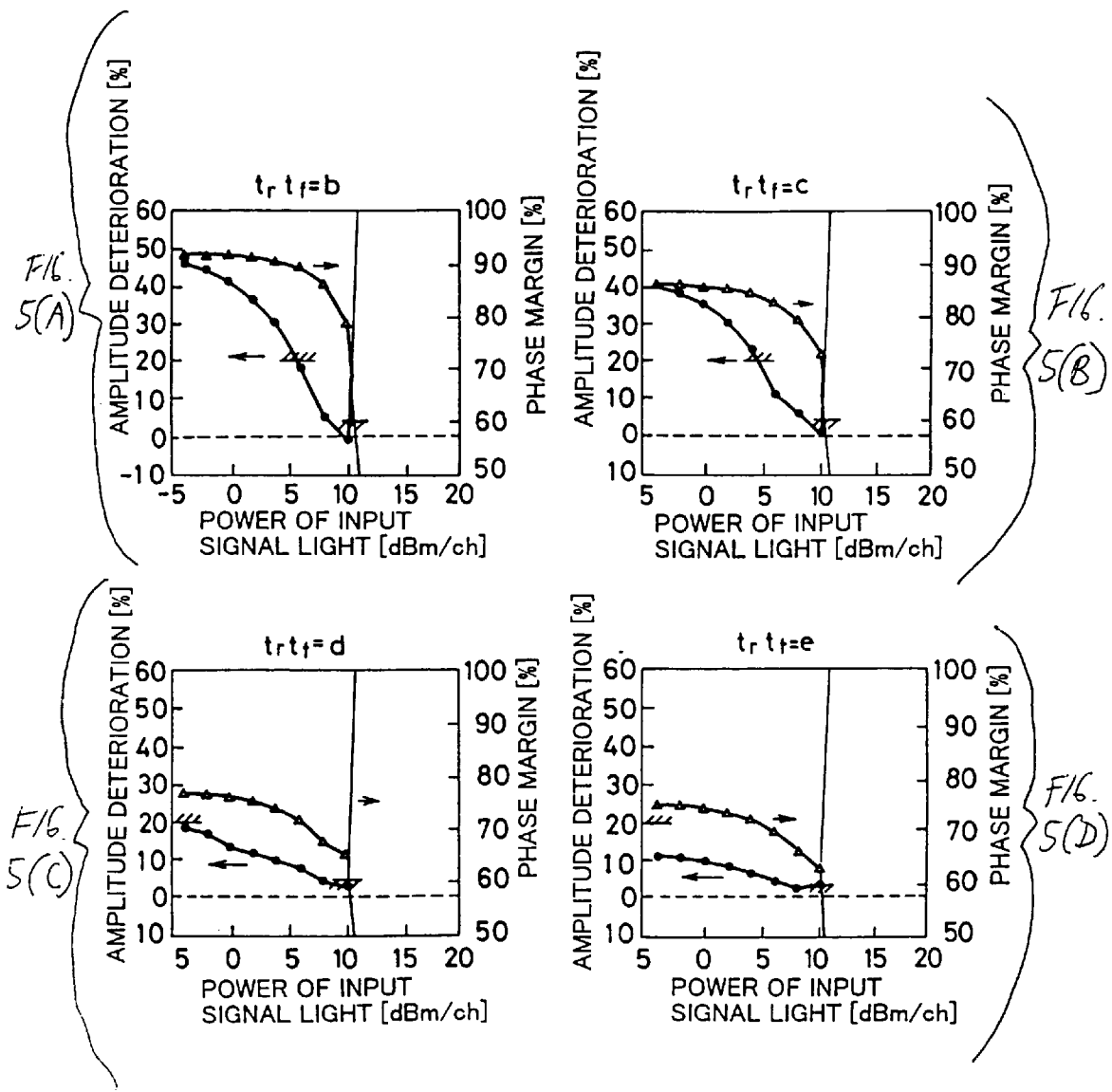

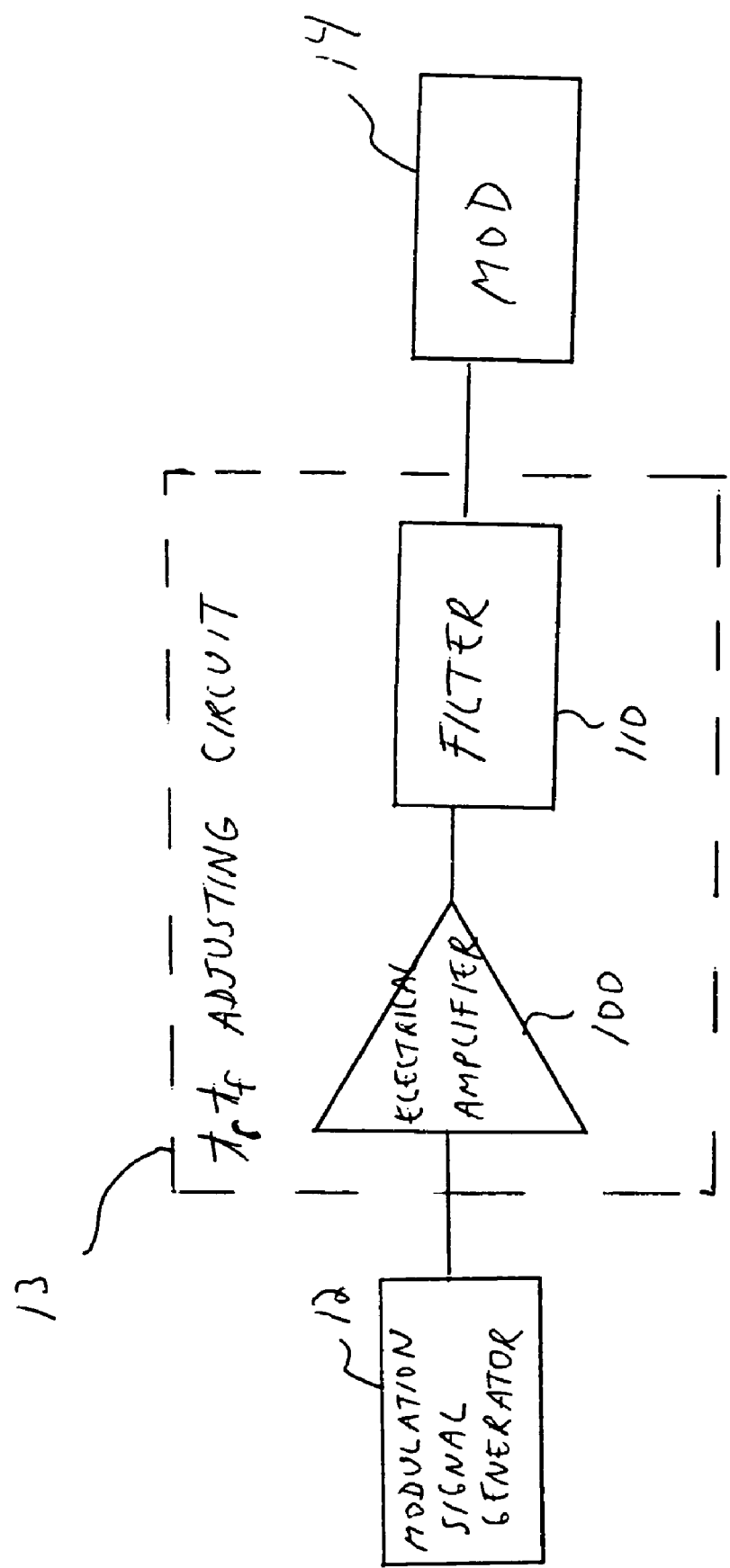

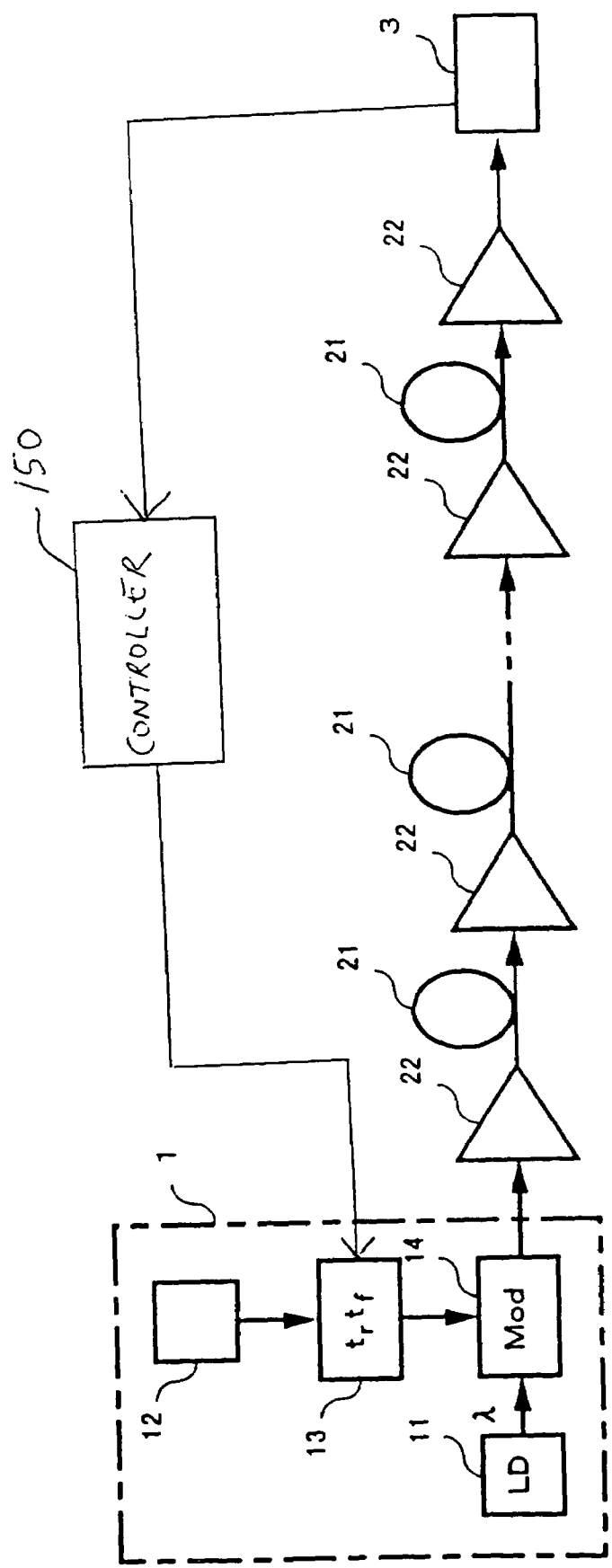

OPTICAL TRANSMISSION APPARATUS AND METHOD WHICH ADJUST RISE AND FALL TIME OF SIGNAL LIGHT TO BE TRANSMITTED

CROSS-REFERENCE TO RELATED APPLICATIONS

This application is based on, and claims priority to, Japanese application number 10-071525, filed on Mar. 20, 1998, in Japan, and which is incorporated herein by reference.

BACKGROUND OF THE INVENTION

1. Field of the Invention

The present invention relates to an optical transmission apparatus and method for restraining influence of wavelength dispersion characteristics or nonlinear effect of a transmission path. More specifically, the present invention relates to an optical transmission apparatus and method which adjusts rise time and/or fall time of signal light to be transmitted, to thereby reduce waveform deterioration of the signal light after transmission.

2. Description of the Related Art

Optical communication systems using fiber optical transmission lines are being used to transmit relatively large amounts of information. However, as users require larger amounts of information to be rapidly transmitted, and as more users are connected to the systems, a further increase in the transmission capacity of optical communication systems is required.

Therefore, there is a continual effort in increase transmission capacity of optical communication systems. In the electrical field of art, Time-Division Multiplexing (TDM) is being used to increase transmission capacity. In the optical field of art, Optical Time-Division Multiplexing (OTDM) and Wavelength-Division Multiplexing (WDM) are being used to increase transmission capacity. Further, optical fiber amplifiers, such as erbium doped fiber amplifiers (EDFA), are being used to realize very long distance optical transmission.

With high-speed transmission in a very long distance optical communication system of large-capacity which utilizes WDM and optical amplifiers, the waveform of the transmitted signal is distorted. This distortion is due, for example, to interaction of spectral spread of signal lights caused by modulation, and to phase chirping caused by a nonlinear effect of an optical fiber, with the wavelength dispersion characteristics of the transmission path. Distortion results in deterioration of transmission characteristics, thereby restricting the transmission rate and the transmission distance.

Therefore, in very long distance optical communications systems having large-capacity, it is important to restrain the wavelength dispersion characteristics of the transmission path.

A conventional technique for restraining influence of wavelength dispersion is disclosed in Japanese Unexamined Patent Publication Nos. 2-30233, 8-237222, 9-116493, and 5-183511, which are incorporated herein by reference. These Japanese Unexamined Patent Publications disclose several techniques, such as (a) a method for offsetting wavelength dispersion characteristics of a transmission path by providing a dispersion compensator which generates dispersion having a sign opposite to the dispersion in the transmission path, (b) a method in which a signal light is provided with pre-chirping at a transmitter, and (c) a method for restricting an influence of wavelength dispersion by combining the above-mentioned dispersion compensator with pre-chirping. In this respect, the term "pre-chirping" indicates that a baseband signal is, in addition to light intensity modulation therefor, intentionally provided with optical phase modulation or optical frequency modulation to restrain spread of waveform due to wavelength dispersion.

However, in these techniques, the amount of dispersion compensation and/or pre-chirping will vary depending on various parameters such as the type of transmission system, transmission rate, type of transmission path, and distance of transmission path. Thus, such amounts must be respectively optimized for each optical communication system. Amounts such as for dispersion compensation and/or pre-chirping, which are optimized for each optical communication system, are assumed to be fixed at the time of introduction of the system. Consequently, it is difficult to extensively change or fine-tune the amounts.

Additionally, it is difficult to commonly use a transmitter, to which pre-chirping is applied, among different types of optical communication systems, since the amount of pre-chirping is different for different optical communication systems. For example, even if it is attempted to commonly apply a transmitter in an optical communication system having a transmission rate of 10 Gb/s to an optical communication system having a transmission rate of 2.5 Gb/s, it is difficult to realize such an attempt because the optimum amount of pre-chirping would be different for each system.

As should be understood from the above, even for those optical communication systems which have configurations similar to one another, it is necessary to develop optical devices which are matched with each system, thereby increasing the number of parts to be developed, and thereby increasing cost.

Further, in a WDM optical communication system in which a plurality of signal lights having different wavelengths are multiplexed together and then transmitted, there occurs fluctuation of transmission qualities between channels (i.e., between signal lights multiplexed together). Such fluctuation is due, for example, to influence of dispersion slope of a transmission path. To avoid this fluctuation, it is necessary, for example, to adopt a dispersion compensator which is capable of compensating the dispersion slope, or to optimize a compensation amount for dispersion and/or an amount of pre-chirping, individually to each of the wavelengths. Unfortunately, such techniques are too expensive since the number of parts is increased if optimization is effected for each of the wavelengths. As a result, the cost of an optical communication system is greatly increased.

SUMMARY OF THE INVENTION

Accordingly, it is an object of the present invention to provide an optical transmission apparatus and method for restraining the influence of wavelength dispersion characteristics and nonlinear effect of a transmission path, and which can be flexibly adapted to different optical communication systems.

Objects of the present invention are achieved by providing an optical transmitter transmitting a signal light to a transmission path, wherein the signal light has a corresponding rise time and fall time and the transmitter adjusts the rise time and/or the fall time.

Objects of the present invention are also achieved by providing an apparatus which includes an adjusting circuit and a modulator. The adjusting circuit adjusts a rise time and/or a fall time of an electrical modulation signal. The modulator modulates a light with the adjusted electrical modulation signal. Based on a bit rate of the optical communication system and a desired rise time and/or fall time, the adjusting circuit can (a) shorten the rise time and/or the fall time, or (b) lengthen the rise time and/or the fall time. In other embodiments, the adjusting circuit can adjust the rise time and/or the fall time to maintain amplitude deterioration and phase margin of the modulated light to be within a specific range after being transmitted through a transmission path and received by a receiver.

In addition, objects of the present invention are achieved by providing an optical communication system which includes a transmitter, a receiver and a controller. The transmitter includes an adjusting circuit adjusting a rise time and/or a fall time of an electrical modulation signal, and a modulator modulating a light with the adjusted electrical modulation signal. The transmitter then transmits the modulated light through a transmission path. The receiver receives the transmitted, modulated light through the transmission path. The controller controls the adjusting circuit to adjust the rise time and/or the fall time in accordance with characteristics of the modulated light at the receiver.

Further, objects of the present invention are achieved by providing a method which includes (a) adjusting a rise time and/or a fall time of a signal light; and (b) transmitting the adjusted signal light through a transmission path. The method can also include (c) receiving the transmitted signal light from the transmission path, wherein said adjusting adjusts the rise time and/or the fall time in accordance with characteristics of the received signal light.

Additional objects and advantages of the invention will be set forth in part in the description which follows, and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 2(A) through 2(E) are graphs showing waveforms of signal lights to be transmitted, respectively, in a waveform simulation performed according to an embodiment of the present invention.

FIGS. 3(A) through 3(E) are graphs showing waveforms of received signal lights, respectively, when the power of signal light input to a transmission path is set at 0 dBm, in a waveform simulation performed according to an embodiment of the present invention.

FIGS. 4(A) through 4(E) are graphs showing waveforms of received signal lights, respectively, when the power of signal light input to a transmission path is set at 5 dBm, in a waveform simulation performed according to an embodiment of the present invention.

FIGS. 5(A) through 5(D) are graphs showing variations of amplitude deterioration and phase margin, when the power of input signal light is varied in a waveform simulation performed according to an embodiment of the present invention.

FIG. 9 is a diagram illustrating an example of an adjusting circuit, according to an embodiment of the present invention.

FIG. 10 is a diagram illustrating an optical communication system, according to an additional embodiment of the present invention.

DESCRIPTION OF THE PREFERRED EMBODIMENTS

Figure 1:
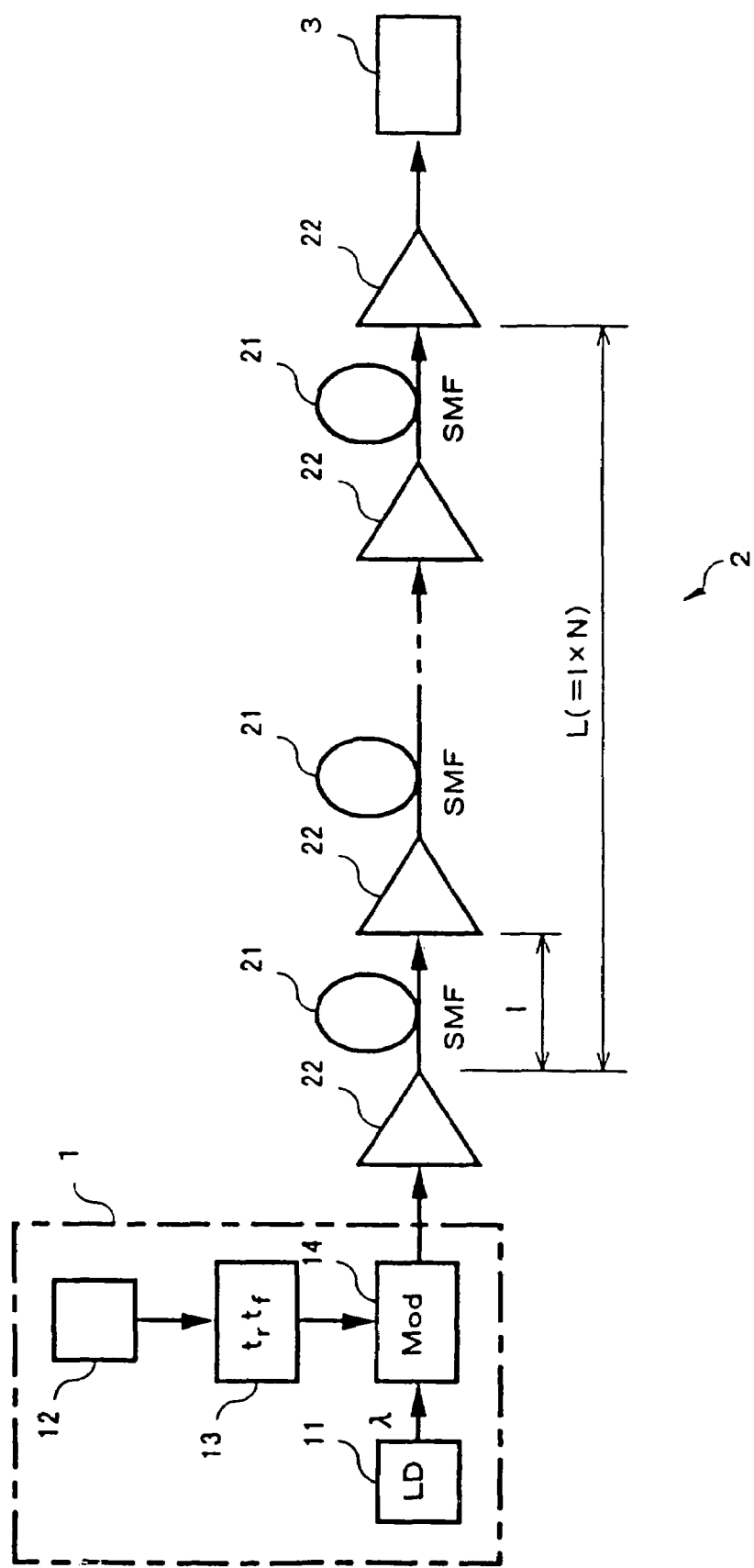
FIG. 1 is a diagram illustrating an optical communication system, according to an embodiment according to the present invention.

Reference will now be made in detail to the present preferred embodiments of the present invention, examples of which are illustrated in the accompanying drawings, wherein like reference numerals refer to like elements throughout.

FIG. 1 is a diagram illustrating an optical communication system, according to an embodiment of the present invention. Referring now to FIG. 1, a transmitting part 1 is an optical transmitting device which generates a signal light with the rise time and fall time thereof being adjusted. Transmitting part 1 sends the adjusted signal light to a transmission path 2. A receiving part 3 is an optical receiving device which receives the signal light transmitted via transmission path 2, and processes the received signal light. Transmission path 2 and receiving part 3 are identical with those adopted in conventional systems, and important aspects of the present invention reside in transmitting part 1.

Transmitting part 1 includes a light source (LD) 11, a modulation signal generator 12, a $t_r, t_f$ adjusting circuit 13 and an optical modulator-(MOD) 14. Light source 11 is typically a laser diode and generates, for example, a continuous light having a wavelength of λ, for a general optical communication. However, light source 11 is not intended to be limited to such a light source, and various other types of light sources can be used.

Modulation signal generator 12 generates an electrical modulation signal corresponding to a transmission signal. $t_r, t_f$ adjusting circuit 13 is a waveform adjusting part which adjusts the rise time (to be referred as $t_r$ hereinbelow) and fall time (to be referred as $t_f$ hereinbelow) of the modulation signal from modulation signal generator 12. Optical modulator 14 modulates the light from light source 11, in accordance with the modulation signal adjusted by $t_r, t_f$ adjusting circuit 13.

Modulation signal generator 12 generates a modulation signal which represents data to be transmitted (transmission signal) at a predetermined transmission rate and with a predetermined encoding format.

$t_r, t_f$ adjusting circuit 13 transforms the waveform of the modulation signal at its rising and falling portions by, for example, passing the modulation signal from modulation signal generator 12 through, for example, an electric filter having an appropriate band. At this time, it can be assumed that the $t_r$ and $t_f$ of the modulation signal are optimized by varying the band of an electric filter of $t_r, t_f$ adjusting circuit 13 in accordance with, for example, reception characteristics of receiving part 3, as described later. The adjusted modulation signal is then sent to optical modulator 14 so that a signal light, the $t_r$ and $t_f$ of which are adjusted, is generated.

To adjust the $t_r$ and $t_f$ of the signal light, it is possible to transform the amplitude of the modulation signal, instead of the aforementioned method in which the waveform of the modulation signal is transformed at its rising and falling portions such as by an electric filter. This substitutional transforming method is provided by making use of such an effect that the $t_r$ and $t_f$ of the signal light to be output are changed as a result of the modulating operation of optical modulator 14 by transforming the amplitude of the modulation signal. In addition, there can be envisaged such a method to adopt an optical filter, or wavelength dispersion apparatus, in the optical field of art.

There are many types of optical modulators which can operate as optical modulator 14. For example, optical modulator 14 can be an optical intensity modulator of MachZehnder interferometer type which utilizes lithium niobate (LiNbO$_3$). By applying the modulation signal output from $t_r t_f$ adjusting circuit 13 to the electrodes of such an optical modulator 14, the refractive index of an optical waveguide path is changed by an electrooptic effect, to thereby modulate the intensity of the light from light source 11, causing generation of a signal light which has $t_r$ and $t_f$ corresponding to the modulation signal. Although not shown in FIG. 1, as with the technique described in the Background of the Invention section, the signal light can be applied with pre-chirping by modulating the optical phase or optical frequency of the signal light, at optical modulator 14. Thus, optical modulator 14 can also have a function as a modulation part of the signal light.

Transmission path 2 can have many different configurations. For example, in FIG. 1, transmission path 2 includes alternately connected single mode optical fibers (SMF) 21 and optical amplifiers 22, where fibers 21 exhibits zero-dispersion near a wavelength of 1.3 µm. It is assumed herein that the whole length (transmission distance) of transmission path 2 is L, the number of repeater sections (i.e., number of SMFs) is N, and the distance of repeater section (i.e., length of each SMF) is "1". As the transmission path, there may be adopted, for example, a dispersion shift fiber (DSF) or dispersion compensation fiber (DCF), instead of, or in addition to, SMF 21.

The light emitted from light source 11 of transmitting part 1 is sent to optical modulator 14. Moreover, optical modulator 14 receives the modulation signal having its rising and falling portions shaped by $t_r t_f$ adjusting circuit 13. Thus, the light from light source 11 is, for example, intensity modulated in accordance with the modulation signal, and is applied, for example, with pre-chirping. The signal light output from optical modulator 14 is then transmitted to receiving part 3, by passing through SMFs 21 and optical amplifiers 22 of transmission path 2. Since the signal light is transmitted via transmission path 2, it is influenced by, for example, wavelength dispersion characteristics and/or non-linear effect of each of SMF 21.

Nonetheless, in the present embodiment of the present invention, the signal light to be transmitted from transmitting part 1 to receiving part 3 has, for example, been applied with pre-chirping, and the $t_r$ and $t_f$ of the signal light have been optimized. Thus, even when the signal light is influenced by, for example, the wavelength dispersion characteristics of transmission path 2, the influence is offset such that the deterioration degree of waveform is restrained. The signal light having a reduced waveform deterioration is then received at receiving part 3, resulting in improvement in reception sensitivity of receiving part 3.

There will be explained hereinafter the improving effect for the waveform deterioration by the optimization of $t_r$ and $t_f$ of signal light to be transmitted, based on the following results of waveform simulation. In the simulation model adopted herein, there is assumed a transmission of one cycle of wavelength of signal light, such as having a transmission rate of 2.5 Gb/s, and a transmission distance L of 640 km (i.e., the number N of repeater sections=8, and the distance "1" of repeater section=80 km). Further, the calculation assumes that α parameter indicative of a value of pre-chirping is +1, a dispersion value of each SMFs 21 is +16.7 ps/nm/km, and no dispersion compensators are used.

FIGS. 2(A) through 2(E) show examples of waveform (eye-pattern) of the signal light which is output from transmitting part 1, when the $t_r$ and $t_f$ are changed.

In FIGS. 2(A) through 2(E), each of the waveforms show an eye pattern of the signal lights under the condition that the $t_r$ and $t_f$ are quickened in the order of from "a" to "e" (a>b>c>d>e). As seen from these figures, the quicker the $t_r$ and $t_f$ are, the steeper the rising and falling of the signal light are. A waveform of signal light which has been adopted in the conventional 2.5 Gb/s transmission is closely similar to that shown in FIG. 2(B).

FIGS. 3 and 4 show the waveforms (eye patterns) of the received signal light, when each of the signal lights shown in FIGS. 2(A) through 2(E) has been transmitted up to receiving part 3 via transmission path 2. FIGS. 3(A) through 3(E) show waveforms, respectively, when a power Pin of signal light input to SMF 21 of each of the repeater sections is set at 0 dBm, while FIGS. 4(A) through (E) show waveforms, respectively, when the power Pin of input signal light is set at +5 dBm.

In these figures, the deterioration of pulse waveform due to wavelength dispersion characteristics of the transmission path is expressed by the fact that the opening part of eye pattern is narrowed (decrease of the eye opening degree) due to pulse compression or pulse broadening. In order to restrain the pulse waveform deterioration, it is enough to previously set the $t_r$ and $t_f$ of the pulse waveform of the signal light to be transmitted, in a direction opposite to the deteriorating direction. Namely, the $t_r$ and $t_f$ shall be set in a delayed manner, in case that the waveform deterioration is to be caused by pulse compression, and the $t_r$ and $t_f$ shall be set in a quickened manner, in case that the waveform deterioration is to be caused by pulse broadening.

In case that α parameter has a positive value here, there is caused pulse broadening when the signal light is transmitted through a transmission path having positive dispersion. Thus, by quickening the $t_r$ and $t_f$ to thereby restraining the pulse broadening, the waveform deterioration be reduced.

Meanwhile, in case of generation of Self Phase Modulation (SPM), which is a nonlinear effect of the transmission path, as a result that the power Pin of signal light input to each of optical fibers 21 is increased, there will occur pulse compression in a transmission path having positive dispersion. Thus, an effect obtained when the power Pin of input signal light is large functions in a manner opposite to that obtained when the power Pin is small with respect to the transmission pulse. Comparing each of the waveforms of FIGS. 3(A) through 3(E) with those of FIGS. 4(A) through 4(E), it is seen that those waveforms of FIGS. 4(A) through 4(E), in which the power Pin of input signal light is increased, are more compressed with respect to pulse thereof, due to the effect of SPM, so that the $t_r$ and $t_f$ are quickened.

As described above, the waveform deterioration of the received signal can be reduced, by adjusting the $t_r$ and $t_f$ of the signal light, at transmitting part 1. The values of $t_r$ and $t_f$ should be set in consideration of their relationship to the reception characteristics of receiving part 3, and to the power of signal light to be input to the transmission path.

Shown in FIGS. 5(A) through 5(D) are variations of amplitude deterioration and phase margin, where the $t_r$ and $t_f$ are set from "b" to "e", and the power Pin of signal light input to the transmission path is varied. In these figures, the amplitude deterioration is represented by a circular mark (left ordinate), and the phase margin is represented by a triangular mark (right ordinate). Here, it can be said that the smaller value of amplitude deterioration is preferred, and so is the larger value of phase margin.

As shown in FIGS. 5(A) through 5(D) ($t_r$ and $t_f$ are "b" to "e", respectively), as the $t_r$ and $t_f$ are quickened, the amplitude deterioration is drastically improved though the phase margin becomes smaller. As noted above, $t_r$ and $t_f$ are required to be set such that the dynamic range is widened as much as possible, taking into consideration of the reception characteristics of receiving part 3. For example, considering such a case that the reception characteristics of receiving part 3 are required to have amplitude deterioration equal to or less than 20% and phase margin equal to or greater than 60%, there can be ensured a wider dynamic range when the $t_r$ and $t_f$ are set, for example, at "d" or "e" which are quicker values.

Figure 6A:
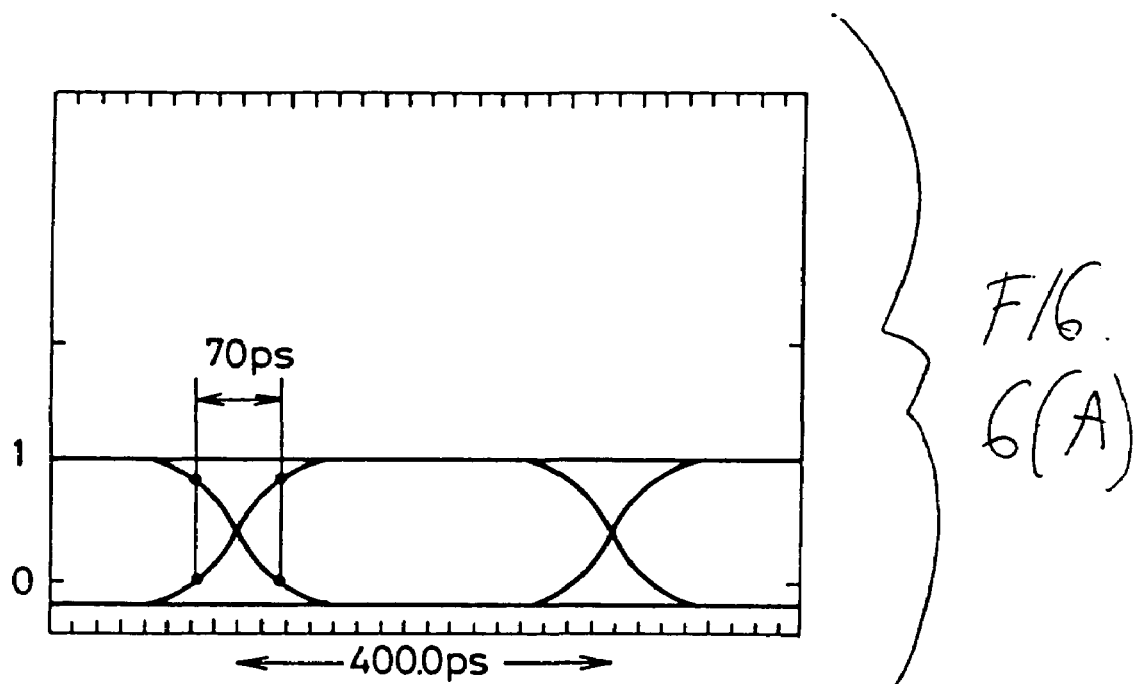
FIGS. 6(A) and 6(B) are graphs showing exemplary waveforms of signal lights to be transmitted, the $t_r$ and $t_f$ of which are optimized, respectively, according to an embodiment of the present invention.
Figure 6B:
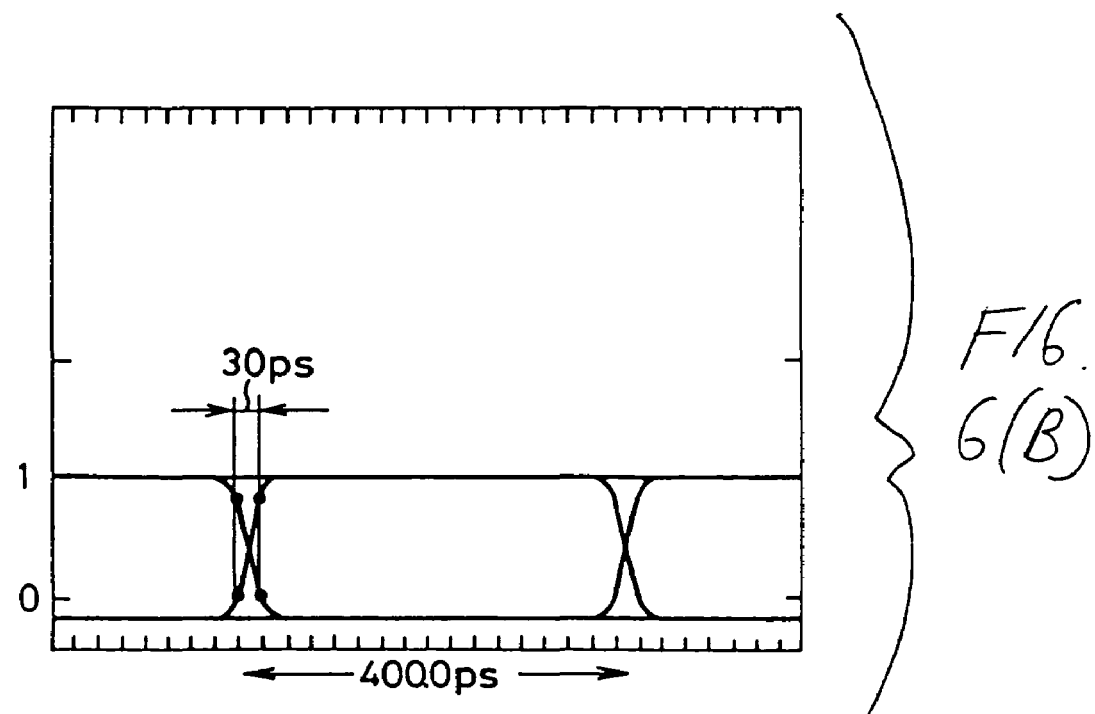

Shown in FIGS. 6(A) and 6(B) are examples of the $t_r$ and $t_f$ of the signal light to be transmitted in a conventional optical communication system of 2.5 Gb/s, in which the aforementioned optimization is effected, as follows.

FIG. 6(A) shows a conventional waveform of the signal light to be transmitted before optimization of $t_r$ and $t_f$, in which the $t_r$ and $t_f$ of this signal light are in the order of 70 ps. It is confirmed that the values of $t_r$ and $t_f$ designate the rise time and fall time, respectively, within the range from 20% to 80% of the amplitude of signal light. Contrary, FIG. 6(B) shows a waveform of the signal light to be transmitted after optimization of $t_r$ and $t_f$, in which the $t_r$ and $t_f$ are set at approximately 30 ps. Excellent transmission characteristics can be obtained when transmission is conducted at 2.5 Gb/s making use of the thus optimized waveform.

Figure 7:
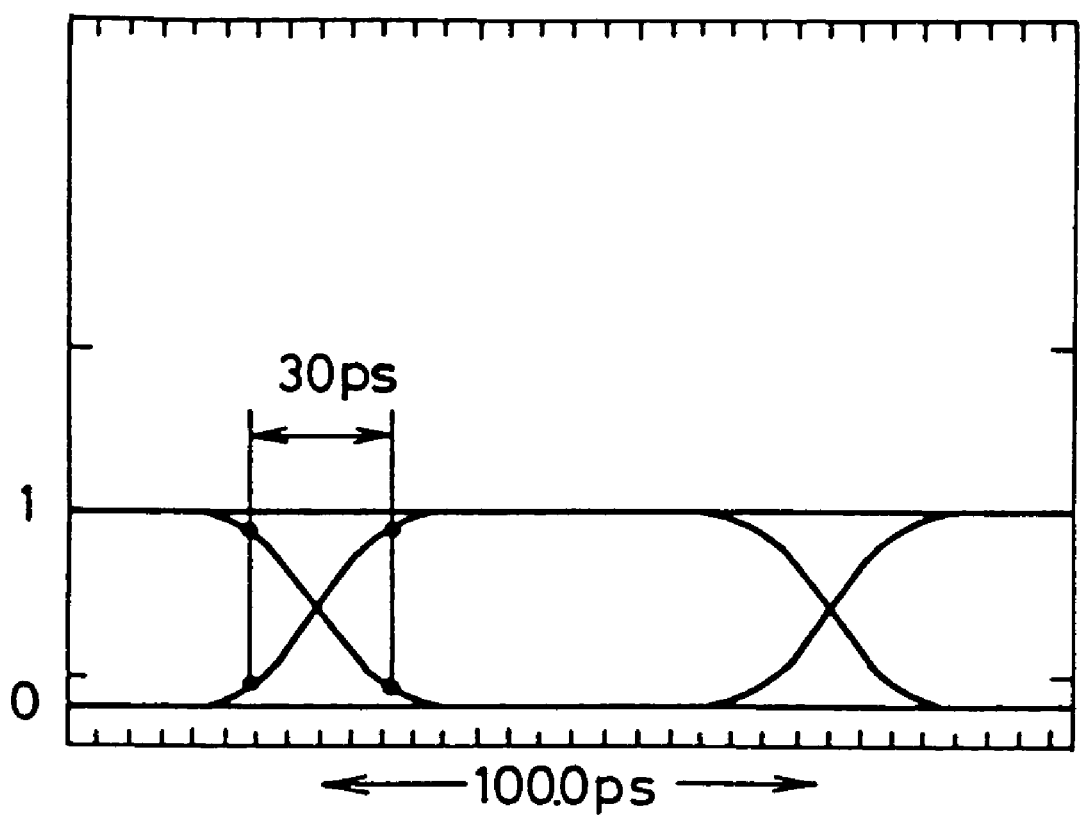
FIG. 7 is a graph showing a waveform of a signal light to be output from a transmitting part which is used in a conventional optical communication system of 10 Gb/s.

In the above, the signal light shown in FIG. 6(B), in which $t_r$ and $t_f$ are in the order of approximately 30 ps, can be also obtained simply by employing a transmitting part of a conventional 10 Gb/s optical communication system, as it is, as that for 2.5 Gb/s. In other words, the transmitting part of conventional 10 Gb/s optical communication system is designed to output a signal light, the $t_r$ and $t_f$ of which are in the order of 30 ps, such as shown in FIG. 7 (however, there is not provided any function to adjust the $t_r$ and $t_f$). Thus, the signal light adapted for 2.5 Gb/s such as shown in FIG. 6(B) can be obtained when the transmitting part for 10 Gb/s is driven by 2.5 Gb/s signal.

This fact suggests that the transmitting part for 2.5 Gb/s and the transmitting part for 10 Gb/s can be commonly used for each other. Namely, the transmitting part for 10 Gb/s has just become to be commonly used. Such a transmitting part can be used in an optical communication system for transmission at 2.5 Gb/s, where $t_r$ and $t_f$ are to be quickened.

According to the above embodiments of the present invention, a signal light is transmitted from transmitting part 1 to receiving part 3 via transmission path 2. Before being transmitted, the $t_r$ and $t_f$ of the signal light are adjusted or optimized, and the signal light may also be provided with pre-chirping, so that the waveform deterioration due to influence of the wavelength dispersion characteristics and nonlinear effect of the transmission path can be effectively reduced and the dynamic range for the signal light to be input to the transmission path is effectively widened. As a result, there can be provided an optical transmission apparatus having excellent transmission characteristics. In addition, the setting of $t_r$ and $t_f$ at transmitting part 1 can be easily done, so that the optical transmission apparatus can be flexibly matched with various optical communication systems. This results in a reduction of the number of different parts used in an optical communication system, and in lower cost. Moreover, by utilizing the adjustment effect for a waveform by virtue of the optimization of $t_r$ and $t_f$ of the signal light to be transmitted, it becomes possible to commonly use transmitting parts among various optical communication systems, thereby further promoting reduction of the number of parts and of cost.

In some optical communication systems, a dispersion compensator may not be necessary to satisfactorily transmit signal light in accordance with, for example, the system transmission rate, transmission distance, and the number of repeater sections. Therefore, an optical communication system as in FIG. 1 may not require a dispersion compensator. However, in the embodiments of the present invention, a dispersion compensator can be provided to perform dispersion compensation, in addition to pre-chirping and adjustment of $t_r$ and $t_f$, to thereby avoid waveform deterioration. Of course, a constitution without pre-chirping may be possible. Meanwhile, the present invention is not limited to such a system which is mentioned in relation to the waveform simulation, and can be applicable to any optical communication system. Moreover, although both of $t_r$ and $t_f$ have been adjusted in the above embodiments of the present invention, it is possible to adjust either one of $t_r$ and $t_f$, without adjusting the other.

Figure 8:
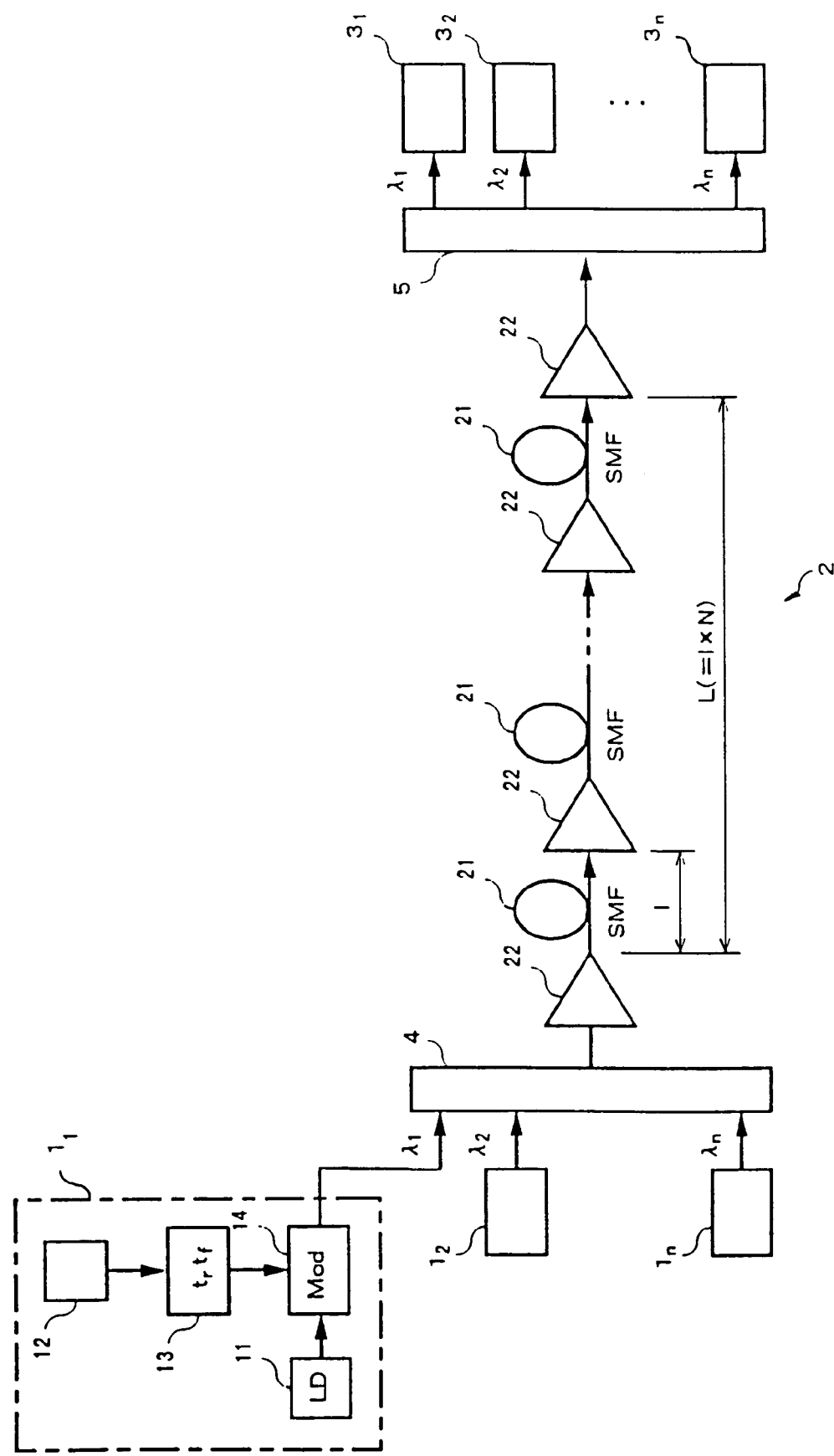
FIG. 8 is a diagram illustrating an optical communication system according to an embodiment of the present invention.

FIG. 8 is a diagram illustrating an optical communication system using WDM, according to an embodiment of the present invention. In FIG. 8, those parts identical with the configuration in FIG. 1 are designated by the same numerals.

Referring now to FIG. 8, the optical communication system includes "n" transmitting parts $1_1$ to $1_n$ for outputting respective signal lights of wavelengths $\lambda_1$ to $\lambda_n$. An optical multiplexer 4 multiplexes signal lights output from transmitting parts $1_1$ to $1_n$, to thereby transmit a single wavelength-division multiplexed signal light to a transmission path 2. An optical demultiplexer 5 demultiplexes the wavelength-division multiplexed signal light transmitted via transmission path 2, into respective signal lights of the wavelengths $\lambda_1$ to $\lambda_n$. "n" receiving parts $3_1$ to $3n$ receive and process the signal lights from optical demultiplexer 5, respectively. Transmitting parts $1_1$ to $1_n$ are identical to transmitting part 1 in FIG. 1, and receiving parts $3_1$ to $3_n$ are identical to receiving part 3 in FIG. 1.

In FIG. 8, the signal lights are preferably optimized in relation to pre-chirping in a manner identical with that for the embodiment in FIG. 1. Similarly, $t_r$ and $t_f$ at each of transmitting parts $1_1$ to $1_n$ are optimized in a manner identical with that for the embodiment in FIG. 1. The signal lights are then sent to optical multiplexer 4. Optical multiplexer 4 multiplexes the signal lights having wavelengths $\lambda_1$ to $\lambda_n$ transmitted from transmitting parts $1_1$ to $1_n$ into a wavelength-division multiplexed signal light, and then transmits a wavelength-division multiplexed signal light to transmission path 2. In transmission path 2, the wavelength-division multiplexed signal light is collectively amplified at each of optical amplifiers 22, and finally transmitted to optical demultiplexer 5. During transmission of the wavelength-division multiplexed signal light through transmission path 2, each of the signal lights having the wavelengths $\lambda_1$ to $\lambda_n$ is influenced by, for example, the wavelength dispersion characteristics and/or nonlinear effect of the transmission path. However, each of the signal lights to be transmitted through transmission path 2 has been optimized with respect to pre-chirping and $t_r$ and $t_f$. Thus, even if the signal lights are influenced by wavelength dispersion characteristics of transmission path 2, the influence is duly offset so that waveform deterioration is reduced.

The wavelength-division multiplexed signal light, which has reached optical demultiplexer 5, is demultiplexed into signal lights of $\lambda_1$ to $\lambda_n$ respectively, and thereafter sent to receiving parts $3_1$ to $3_n$, respectively. Receiving parts $3_1$ to $3_n$ receive the signal lights from optical demultiplexer 5, and duly process them.

According to embodiments of the present invention as in FIG. 8, in a WDM optical communication system in which a wavelength-division multiplexed signal light is transmitted, operational characteristics of the system can be improved by optimizing the $t_r$ and $t_f$ of each of the signal lights having wavelengths $\lambda_1$ to $\lambda_n$, respectively.

In the embodiment of the present invention illustrated in FIG. 8, a dispersion compensator is not used. However, the present embodiment is not limited to this configuration, and may include a dispersion compensator to perform dispersion compensation, in addition to pre-chirping and adjustment of $t_r$ and $t_f$, to thereby reduce waveform deterioration. Of course, a configuration without pre-chirping may be possible. Moreover, although both of $t_r$ and $t_f$ have been adjusted, it is possible to adjust either one of $t_r$ and $t_f$ without adjusting the other.

According to the above embodiments of the present invention, a $t_r,t_f$ adjusting circuit 13 adjusts the rise time $t_r$ and/or the fall time $t_f$ of a modulation signal.

FIG. 9 is a diagram illustrating an example of $t_r,t_f$ adjusting circuit 13, according to an embodiment of the present invention. Referring now to FIG. 9, a typical configuration for $t_r,t_f$ adjusting circuit 13 includes an electrical amplifier 100 to amplify the electrical modulation signal, and a filter 110. Typically, filter 110 would be a low-pass filter. By changing the bandwidth of filter 110, the bandwidth of the series combination of amplifier 100 and filter 110 will change.

In practice, it is difficult to reduce the rise time $t_r$ and/or the fall time $t_f$. Therefore, in a practical system, it may be preferable to actually start with a modulation signal having a faster rise time $t_r$ and/or fall time $t_f$ than finally required. Then, $t_r,t_f$ adjusting circuit 13 can be used to increase (length) the rise time $t_r$ and/or the fall time $t_f$. For example, the configuration in FIG. 9, using a low-pass filter as filter 110, can be used to increase (lengthen) the rise time $t_r$ and the fall time $t_f$.

In embodiments where the rise time $t_r$ and/or the fall time $t_r$ must be reduced (shortened), filter 110 may not be necessary in $t_r,t_f$ adjusting circuit 13.

In some cases, depending on the bit rate of the optical communication system, a simple wire can operate as $t_r,t_f$ adjusting circuit 13 to control the rise time $t_r$ and fall time $t_f$. Typically, this wire would be a microstrip line used at high bandwidths. By changing the wire characteristics, the rise time $t_r$ and fall time $t_f$ can be made longer, or can be kept the same. This approach, using only a wire, generally would be effective with high bit rate (2.5 Gb/s or higher) modulation signals.

Moreover, optical modulator 14 has a corresponding bandwidth. The bandwidth of optical modulator 14 can be changed so that optical modulator 14 operates as a $t_r,t_f$ adjusting circuit to change the rise time $t_r$ and the fall time $t_f$.

There are many different designs which can be implemented as $t_r,t_f$ adjusting circuit 13, and, in view of the above, a $t_r,t_f$ adjusting circuit would easily be realizable by a person of ordinary skill in the art. The present invention is not intended to be limited to the specific embodiments for a $t_r,t_f$ adjusting circuit which are specifically disclosed herein.

According to the above embodiments of the present invention, in a WDM optical communication system, waveform deterioration of signal lights (or "channels") multiplexed together into a WDM signal and having different wavelengths can be reduced by adjusting the rise time and/or fall time of each of the signal lights. Each channel in the WDM signal can have different bit rates, and $t_r,t_f$ adjusting circuit 13 can have the same common configuration for each channel. Similarly, modulation signal generator 12 can have the same common configuration for each channel. This reduces the number of different parts required for the WDM optical communication system, thereby reducing overall system cost. In this case, $t_r,t_f$ adjusting circuit 13 (having the same configuration in each channel) and modulation signal generator 12 (having the same configuration in each channel) can be operable at high bit rates (for example, 10 Gb/s), but each channel can be operable at a different bit rate which is equal to, or lower than, this high bit rate. As an example, in FIG. 8, $t_r,t_f$ adjusting circuit 13 in each transmitting part $1_1$ to $1_n$ can have the same configuration and be operable, for example, at 10 Gb/s. In this case, for example, each $t_r,t_f$ adjusting circuit 13 can have a configuration as illustrated in FIG. 9. At the same time, for example, modulation signal generator 12 in each transmitting part $1_1$ to $1_n$ can have the same configuration and be operable, for example, at 10 Gb/s. Further, each channel can operate at a different bit rate which is equal to, or lower than, 10 Gb/s.

According to the above embodiments of the present invention, a $t_r,t_f$ adjusting circuit 13 adjusts the rise time $t_r$ and/or the fall time $t_f$ of a modulation signal. The amount of adjustment of rise time $t_r$ and/or the fall time $t_f$ by $t_r,t_f$ adjusting circuit 13 can be set in advance, such as when the system is initially designed or installed. Typically, the amount of adjustment to the rise time $t_r$ and the fall time $t_f$ provided by $t_r,t_f$ adjusting circuit 13 is fixed when the system is designed, and is not changed. Therefore, in a typical optical communication system employing the embodiments of the present invention, feedback would not be required to change the amount of adjustment to the rise time $t_r$ and/or the fall time $t_f$ provided by $t_r,t_f$ adjusting circuit 13.

However, according to embodiments of the present invention, the rise time $t_r$ and/or the fall time $t_f$ can be adjusted based on characteristics of signal light at a receiver, such as at any of receiving parts $3_1$ to $3_n$ in FIG. 8. As the amount of adjustment performed by $t_r,t_f$ adjusting circuit 13 may be very infrequently changed, the characteristics of signal light at the receiver can be visually inspected by a system operator (that is, a human), and appropriate modifications can then be made to $t_r,t_f$ adjusting circuit 13 to provide the required adjustment to the rise time $t_r$ and/or the fall time $t_f$. In some cases, it may be possible to provide automatic control providing feedback so that $t_r,t_f$ adjusting circuit 13 is controlled in accordance with reception characteristics.

For example, FIG. 10 is a diagram illustrating a controller 150 controlling $t_r,t_f$ adjusting circuit 13 in accordance with characteristics of signal light at receiving part 3. As indicated above, controller 150 can represent human control of visually inspecting the characteristics of signal light at receiving part 3, and making appropriate adjustments to $t_r,t_f$ adjusting circuit 13. For example, if $t_r,t_f$ adjusting circuit 13 is configured as in FIG. 9 with a filter 110, such adjustments to $t_r, t_f$ adjusting circuit 13 might include changing the bandwidth of filter 110.

Moreover, as indicated above, controller 150 can represent automatic control of $t_r, t_f$ adjusting circuit 13 in accordance with characteristics of signal light at reception part 2. The design of an electronic controller for detecting reception characteristics at receiving part 3 and automatically controlling $t_r, t_f$ adjusting circuit 13 in response thereto, would easily be realizable by a person of skill in the art.

According to the above embodiments of the present invention, an optical transmitting device transmits a signal light modulated in accordance with a transmission signal, to a transmission path. The optical transmitting device transmits the signal light to the transmission path, with at least one of rise time and fall time of the signal light being changed. By changing either one or both of the rise time and fall time of the signal light to be transmitted, it becomes possible to transmit the signal light having a waveform which can offset an influence of wavelength dispersion characteristics and nonlinear effect of the transmission path. Thus, the waveform deterioration of the signal light after transmission can be reduced. The use of a $t_r, t_f$ adjusting circuit allows the rise time and/or fall time of the signal light to be easily modified, so that it becomes possible to flexibly deal with various optical communication systems. This results in reduction of the number of parts or items to be developed, and in lower cost.

Further, according to the above embodiments of the present invention, at least one of the rise time and fall time of the signal light can be adjusted in accordance with reception characteristics of an optical receiving device connected to the optical transmitting device via the transmission path. As a result, there can be provided an optical transmission apparatus and method which is superior in transmission characteristics and has a widened dynamic input range.

Further, according to the above embodiments of the present invention, there may be commonly used another optical transmitting device which is used in another optical transmission apparatus having another transmission rate different from that of the present apparatus. Thus, it becomes possible to use a common optical transmitting device among optical transmission apparatuses having transmission rates different from one another. As a result, it becomes possible to further promote reduction of the number of parts and of cost.

According to the above embodiments of the present invention, signal light is modulated with a modulation signal, such as an electrical modulation signal. The signal light can be modulated by, for example, either optical phase modulation or optical frequency modulation. Thus, there can be conducted pre-chirping onto the signal light to be transmitted from the optical transmitting device to the transmission path, so that the waveform deterioration of the signal light after transmission can be further reduced.

Moreover, according to the above embodiments of the present invention, a dispersion compensator can be used to compensate for wavelength dispersion characteristics of the transmission path. Accordingly, the signal light transmitted from an optical transmitting device is passed through the dispersion compensator, so that the wavelength dispersion in the transmission path is compensated, resulting in further reduction of the waveform deterioration of the signal light after transmission. Such a dispersion compensator can be, for example, a dispersion compensation fiber (DCF) positioned along the transmission path. For example, in FIG. 1, one of SMFs 21 can be a DCF.

According to the above embodiments of the present invention, an optical transmitting apparatus includes an adjusting circuit and a modulator. The adjusting circuit adjusts a rise time and a fall time of an electrical modulation signal. The modulator modulates a light with the adjusted electrical modulation signal. Based on a bit rate of the optical communication system and a desired rise time and fall time, the adjusting circuit can (a) shorten the rise time and the fall time, or (b) lengthen the rise time and the fall time. In other embodiments, the adjusting circuit can adjust the rise time and the fall time to maintain amplitude deterioration and phase margin of the modulated light to be within a specific range after being transmitted through a transmission path and received by a receiver.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
   an optical transmitter comprising
   a light source emitting a light,
   a modulation signal generator generating an electrical modulation signal having a corresponding rise time and fall time,
   an adjusting circuit adjusting at least one of the rise time and fall time of the electrical modulation signal, and
   a modulator modulating the emitted light with the adjusted electrical modulation signal, the optical transmitter transmitting the modulated light to an optical transmission path; and
   a receiver receiving the transmitted, modulated light through the optical transmission path, wherein the adjusting circuit adjusts at least one of the rise time and fall time in accordance with characteristics of the modulated light at the receiver.

2. An apparatus as in claim 1, wherein the adjusting circuit adjusts both the rise time and the fall time.

3. An apparatus as in claim 1, wherein the adjusting circuit lengthens both the rise time and the fall time.

4. An apparatus as in claim 1, wherein the adjusting circuit shortens both the rise time and the fall time.

5. An apparatus as in claim 1, wherein the adjusting circuit adjusts both the rise time and the fall time to maintain amplitude deterioration and phase margin of the transmitted modulated light within a specific range.

6. An apparatus as in claim 1, wherein the adjusting circuit performs one of
   lengthening both the rise time and the fall time in accordance with the characteristics of the transmitted modulated light at the receiver,
   shortening both the rise time and the fall time in accordance with the characteristics of the transmitted modulated light at the receiver, and
   adjusting both the rise time and the fall time to maintain amplitude deterioration and phase margin of the transmitted modulated light within a specific range in accordance with the characteristics of the transmitted modulated light at the receiver.

7. An apparatus as in claim 1, further comprising:
   a controller controlling the adjusting circuit to adjust said at least one of the rise time and fall time in accordance with the characteristics of the transmitted modulated light at the receiver.

8. An apparatus as in claim 1, wherein the modulator modulates the emitted light via one of the group consisting of optical phase modulation and optical frequency modulation.

9. An apparatus as in claim 1, further comprising:
a dispersion compensator compensating for wavelength dispersion characteristics of the optical transmission path.

10. An apparatus as in claim 1, further comprising:
a plurality of said optical transmitters, each transmitting a respective modulated light having a different wavelength than the modulated lights of the other optical transmitters; and
an optical multiplexer multiplexing the modulated lights together into a wavelength division multiplexed (WDM) signal which is transmitted through the optical transmission path.

11. An apparatus comprising:
an adjusting circuit adjusting at least one of a rise time and a fall time of an electrical modulation signal; and
a modulator modulating a light with the adjusted electrical modulation signal, wherein the adjusting circuit adjusts said at least one of the rise time and the fall time in accordance with characteristics of the modulated light as received by a receiver through an optical transmission path.

12. An apparatus as in claim 11, wherein the adjusting circuit adjusts both the rise time and the fall time.

13. An apparatus as in claim 11, wherein the adjusting circuit lengthens both the rise time and the fall time.

14. An apparatus as in claim 11, wherein the adjusting circuit shortens both the rise time and the fall time.

15. An apparatus as in claim 11, wherein the adjusting circuit adjusts both the rise time and the fall time to maintain amplitude deterioration and phase margin of the modulated light within a specific range.

16. An apparatus as in claim 11, further comprising:
a controller controlling the adjusting circuit to adjust said at least one of the rise time and fall time in accordance with the characteristics of the modulated light at the receiver.

17. An apparatus as in claim 11, wherein the modulator modulates the light via one of the group consisting of optical phase modulation and optical frequency modulation.

18. An apparatus as in claim 11, further comprising:
a dispersion compensator compensating for wavelength dispersion characteristics of the optical transmission path.

19. An apparatus as in claim 11, wherein the adjusting circuit comprises:
a electrical amplifier amplifying the electrical modulation signal; and
a filter filtering the amplified electrical modulation signal.

20. An optical communication system comprising:
a transmitter including an adjusting circuit adjusting at least one of a rise time and a fall time of an electrical modulation signal, and a modulator modulating a light with the adjusted electrical modulation signal, the transmitter transmitting the modulated light through an optical transmission path;
a receiver receiving the transmitted, modulated light through the optical transmission path; and
a controller controlling the adjusting circuit to adjust said at least one of the rise time and fall time in accordance with characteristics of the modulated light at the receiver.

21. An optical communication system as in claim 20, wherein the controller controls the adjusting circuit to perform one of:
lengthening both the rise time and the fall time in accordance with characteristics of the modulated light at the receiver,
shortening both the rise time and the fall time in accordance with characteristics of the modulated light at the receiver, and
adjusting both the rise time and the fall time to maintain amplitude deterioration and phase margin of the modulated light within a specific range in accordance with characteristics of the modulated light at the receiver.

22. An apparatus comprising:
an adjusting circuit adjusting at least one of a rise time and a fall time of a modulation signal; and
a modulator modulating a light with the adjusted modulation signal, wherein the adjusting circuit adjusts said at least one of the rise time and the fall time in accordance with characteristics of the modulated light as received by a receiver through an optical transmission path.

23. An apparatus as in claim 22, wherein the adjusting circuit performs one of:
adjusting both the rise time and the fall time,
lengthening both the rise time and the fall time, and
shortening both the rise time and the fall time.

24. An apparatus as in claim 22, further comprising:
a controller controlling the adjusting circuit to adjust said at least one of the rise time and fall time in accordance with the characteristics of the modulated light at the receiver.

25. An apparatus as in claim 22, wherein the adjusting circuit comprises:
an amplifier amplifying the modulation signal; and
a filter filtering the amplified modulation signal.

26. A method comprising:
adjusting at least one of a rise time and a fall time of an electrical modulation signal;
modulating a light with the adjusted electrical modulation signal; and
transmitting the modulated light through an optical transmission path, wherein said adjusting adjusts at least one of the rise time and the fall time in accordance with characteristics of the modulated light as received by a receiver through the optical transmission path.

27. A method comprising:
adjusting at least one of a rise time and a fall time of a modulation signal;
modulating a light with the adjusted modulation signal;
transmitting the modulated light through an optical transmission path; and
receiving the transmitted, modulated light from the optical transmission path, wherein said adjusting adjusts said at least one of the rise time and the fall time in accordance with characteristics of the transmitted, modulated light as received by said receiving.

28. An apparatus comprising:
means for adjusting at least one of a rise time and a fall time of a modulation signal; and
a modulator modulating a light with the adjusted modulation signal, wherein said means adjusts said at least one of the rise time and the fall time in accordance with characteristics of the modulated light as received by a receiver through an optical transmission path.

29. An apparatus comprising:
a plurality of transmitting devices, each comprising
   a light source emitting a light,
   a modulation signal generator generating an electrical modulation signal having a corresponding rise time and fall time,
   an adjusting circuit adjusting at least one of the rise time and fall time of the electrical modulation signal, and
   a modulator modulating the emitted light with the adjusted electrical modulation signal, the emitted light of each light source being at a different wavelength than the emitted light of the other light sources so that the plurality of transmitting devices thereby produce a plurality of modulated lights, respectively, at different wavelengths; and
an optical multiplexer multiplexing the plurality of modulated lights into a wavelength division multiplexed (WDM) light wherein, in each transmitting device, the adjusting circuit of the respective transmitting device adjusts at least one of the rise time and fall time in accordance with characteristics of the modulated light of the respective transmitting device at a receiver receiving the respective modulated light from the WDM light.

30. An apparatus comprising:
a light source emitting a light,
a modulation signal generator generating an electrical modulation signal having a corresponding rise time and fall time,
an adjusting circuit adjusting at least one of the rise time and fall time of the electrical modulation signal,
a modulator modulating the emitted light with the adjusted electrical modulation signal, to thereby produce a modulated light; and
an optical multiplexer multiplexing the modulated light with lights at different wavelengths than the light emitted by the light source, to thereby produce a wavelength division multiplexed (WDM) light, wherein the adjusting circuit adjusts at least one of the rise time and fall time in accordance with characteristics of the modulated light at a receiver receiving the modulated light from the WDM light.

* * * * *

UNITED STATES PATENT AND TRADEMARK OFFICE
CERTIFICATE OF CORRECTION

PATENT NO. : 7,020,399 B1 Page 1 of 1
APPLICATION NO. : 09/272404
DATED : March 28, 2006
INVENTOR(S) : Miyata et al.

It is certified that error appears in the above-identified patent and that said Letters Patent is hereby corrected as shown below:

column 12, line 50 in claim 6, after "of" insert --:-- column 13, line 51 in claim 19, delete "a" and insert --an--

Signed and Sealed this

Fifteenth Day of August, 2006

JON W. DUDAS
*Director of the United States Patent and Trademark Office*